United States Patent
Gumtow et al.

(10) Patent No.: US 8,201,149 B1
(45) Date of Patent: *Jun. 12, 2012

(54) SYSTEM AND METHOD FOR REMOTE EXECUTION OF A DEBUGGING UTILITY USING A REMOTE MANAGEMENT MODULE

(75) Inventors: Eric Gumtow, Sunnyvale, CA (US); Pradeep Kumar Kalra, San Jose, CA (US); Kiran Kamity, Santa Clara, CA (US); Yee-Peng Wang, Los Altos Hills, CA (US)

(73) Assignee: NetApp, Inc., Sunnyvale, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 12/554,171

(22) Filed: Sep. 4, 2009

Related U.S. Application Data

(63) Continuation of application No. 11/171,558, filed on Jun. 30, 2005, now Pat. No. 7,634,760.

(60) Provisional application No. 60/683,961, filed on May 23, 2005.

(51) Int. Cl.
G06F 9/44 (2006.01)

(52) U.S. Cl. .................... 717/124; 717/127

(58) Field of Classification Search .............. None
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,670,880 A | 6/1987 | Jitsukawa et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |

(Continued)

FOREIGN PATENT DOCUMENTS

EP 0 621 706 A 10/1994

(Continued)

OTHER PUBLICATIONS

Phillips Semiconductors, The I²C Bus Specification, Jan. 2000, Version 2.1-2000, pp. 6, 7, 10, 13-15.

(Continued)

*Primary Examiner* — Chuck Kendall
(74) *Attorney, Agent, or Firm* — Cesari and McKenna, LLP

(57) ABSTRACT

A system and method enables remote execution of a program, such as a debugger, using a remote management module. A packet daemon executing on the remote management module packetizes data received from a client and forwards it to a packet daemon executing on a computer, which receives the packet and forwards data contained therein to the program. Data from the program is packetized by the packet daemon executing on the computer and transmitted to the packet daemon executing on the remote management module, which forwards the data to a program specific daemon on the remote management module for forwarding to the client.

20 Claims, 11 Drawing Sheets

U.S. PATENT DOCUMENTS

| | | | |
|---|---|---|---|
| 5,155,835 | A | 10/1992 | Belsan |
| 5,241,549 | A | 8/1993 | Moon et al. |
| 5,426,747 | A | 6/1995 | Weinreb et al. |
| 5,555,438 | A | 9/1996 | Blech et al. |
| 5,581,724 | A | 12/1996 | Belsan et al. |
| 5,664,101 | A | 9/1997 | Picache |
| 5,815,652 | A | 9/1998 | Ote et al. |
| 5,819,292 | A | 10/1998 | Hitz et al. |
| 5,822,514 | A | 10/1998 | Steinz et al. |
| 5,881,078 | A | 3/1999 | Hanawa et al. |
| 6,170,067 | B1 | 1/2001 | Liu et al. |
| 6,275,526 | B1 | 8/2001 | Kim et al. |
| 6,335,967 | B1 | 1/2002 | Blomkvist |
| 6,507,929 | B1 | 1/2003 | Durham et al. |
| 6,586,911 | B1 | 7/2003 | Smith |
| 6,636,879 | B1 | 10/2003 | Doucette et al. |
| 6,643,654 | B1 | 11/2003 | Patel et al. |
| 6,651,190 | B1 | 11/2003 | Worley et al. |
| 6,690,733 | B1 | 2/2004 | Baumgartner et al. |
| 6,697,962 | B1 | 2/2004 | McCrory et al. |
| 6,728,908 | B1 | 4/2004 | Fukuhara et al. |
| 6,920,502 | B2 | 7/2005 | Araujo et al. |
| 6,976,058 | B1 | 12/2005 | Brown et al. |
| 7,003,563 | B2 | 2/2006 | Leigh et al. |
| 7,114,102 | B2 | 9/2006 | Chan et al. |
| 7,234,051 | B2 | 6/2007 | Munguia et al. |
| 7,466,713 | B2 | 12/2008 | Saito |
| 7,634,760 | B1 * | 12/2009 | Gumtow et al. ............. 717/125 |
| 2001/0056483 | A1 | 12/2001 | Davis |
| 2003/0061320 | A1 | 3/2003 | Grover et al. |
| 2005/0033952 | A1 | 2/2005 | Britson |
| 2005/0044170 | A1 | 2/2005 | Cox et al. |
| 2005/0044207 | A1 | 2/2005 | Goss et al. |
| 2005/0129035 | A1 | 6/2005 | Saito |
| 2005/0144493 | A1 | 6/2005 | Cromer et al. |
| 2005/0188071 | A1 | 8/2005 | Childress et al. |
| 2005/0193021 | A1 | 9/2005 | Peleg |
| 2005/0221722 | A1 | 10/2005 | Cheong |
| 2005/0288828 | A1 | 12/2005 | Claseman |
| 2006/0039468 | A1 | 2/2006 | Emerson et al. |
| 2003/0088805 | A1 | 5/2006 | Majni et al. |
| 2006/0156054 | A1 | 7/2006 | Brown et al. |
| 2006/0179184 | A1 | 8/2006 | Fields et al. |
| 2006/0200471 | A1 | 9/2006 | Holland et al. |
| 2006/0200641 | A1 | 9/2006 | Insley et al. |

FOREIGN PATENT DOCUMENTS

| | | |
|---|---|---|
| JP | 58181395 | 10/1983 |
| WO | WO 89/10594 | 11/1989 |
| WO | WO 03023561 | 3/2003 |

OTHER PUBLICATIONS

Stallman, et al., "Debugging with GDB: The GNU Source-Level Debugger", published by the Free Software Foundation, Inc., Copyright 1988-2002, 329 pages.
Administration Guide found at http://www.openafs.org/pages/doc/AdminGuide/auagd010.htm, visited on Mar. 2, 2005.
Basilico, et al., *Error Correction System Using "Shadow Memory,"* IBM Technical Disclosure Bulletin, May 1984, pp. 5792-5793.
Bitton, Dina, *Disk Shadowing*, Proceedings of the 14th VLDB Conference, LA, CA (1988).
Blasgen, M.W. et al., *System R: An architectural Overview*, Reprinted from IBM Systems Journal vol. 20, No. 1, 1981©1981, 1999.
Borenstein, Nathaniel S., *CMU's Andrew project a retrospective*, Communications of ACM, (39)12, Dec. 1996.
Brown, Mark R. et al., *The Alpine file system*, ACM Transactions on Computing Systems, 3(4):261-293, Nov. 1985.
Chen, Peter M., et al., *An Evaluation of Redundant Arrays of Disks Using an Amdahl 5890* Performance Evaluation, pp. 74-85, 1990.
Chutani, Sailesh, et al., *The Episode file system*, In Proceedings of the USENIX Winter 1992.
Clark, B.E., et al., *Application System /400 Performance Characteristics*, IBM Systems Journal, 28(3): 407-423, 1989.
Data Sheet for the Check Point Software Technologies product Flood-Gate-1 (1997).
Dibble, Peter C., et al., Beyond Striping: The Bridge Multiprocessor File System, Computer Science Department, University of Rochester, Aug. 11, 1989.
Douglis, Fred, et al., *A comparison of two distributed systems: Amoeba and Sprite*—Computing Systems, 4(4), Fall 1991, pp. 353-385.
Gait, Jason, *Phoenix: A Safe In-Memory File System*. Communications of the ACM, 33(1):81-86, Jan. 1990.
Hartman, John H. et al., *Performance Measurements of a Multiprocessor Sprite Kernel*, Proceedings of the USENIX Conference, 1990.
Hitz, Dave et al., *File System Design for an NFS File Server Appliance*, Technical Report 3002, Rev. C395, presented Jan. 19, 1994.
Howard, John H, et al. *Scale and Performance in a Distributed File System*, Carnegie Mellon University, CMU-ITC-87-068, Aug. 5, 1987.
Howard, John, H. et al., *Scale and performance in a distributed file system*, ACM Trans. Computer. System., 6(1), Feb. 1988 pp. 51-81.
Howard, John H., *An Overview of the Andrew File System*, Carnegie Mellon University, CMU-ITC-88-062, 1988.
*The IBM System/38*, Chapter 8, pp. 137-157, 1980.
Isomaki, Markus, *Differentiated Service for the Internet*, Department of Technical Physics and Mathematics, May 9, 1998.
Kazar, Michael L., et al., *Decorum File System Architectural Overview*, USENIX Summer Conference, Anaheim, California, 1990.
Lomet, David., et al., *The performance of a multiversion access method*, ACM SIGMOD International Conference on Management of Data, 19:353-363, 1990.
Lorie, Raymond, A, *Physical integrity in a large segmented database*, ACM Trans. Database Systems, (2)1:91-104, Mar. 1977.
Lorie, RA, *Shadow Page Mechanism*, IBM Technical Disclosure Bulletin, Jun. 1986, pp. 340-342.
McKusick, Marshall Kirk, et al., *A Fast File System for UNIX*, Computer Science Division, Department of Electrical Engineering and Computer Sciences, Univ. of CA, Berkley, Feb. 18, 1994.
Miller, Ethan L., et al., *RAMA:A File System for Massively Parallel Computers*, 12th IEEE Symposium on Mass Storage Systems, Monterey CA, Apr. 1993, pp. 163-168.
Moons, Herman et al., *Location-Independent Object Invocation in Open Distributed Systems*, Autumn 1991 EurOpen Technical Conference and Exhibition, pp. 287-300 (Sep. 16-20, 1991).
Morris, James H., Et Al, *Andrew: A Distributed Personal Computing Environment*, Comm. of the ACM, vol. 29, Mar. 1986, pp. 184-201.
Mullender, Sape J., et al., *A distributed file service based on optimistic concurrency control*, ACM Symposium on Operating System Principles (Orcas Island, Washington). Published as Operating Systems Review, 19(5):51-62, Dec. 1985.
Muller, Keith, et al., *A High Performance Multi-Structured File System Design*, In Proceedings of the 13th ACM Symposium on Operating Systems Principles, Oct. 1991, pp. 56-67.
Ousterhout, John K. et al., *The Sprite Network Operating System*, Computer Science Division, Department of Electrical Engineering and Computer Sciences, Univ. of CA, Berkley, Nov. 19, 1987.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Ousterhout, John, *Why Aren't Operating Systems Getting Faster as Fast as Hardware?*, Digital WRL Technical Note TN-11, Oct. 1989.
Ousterhout, John, *A Brief Retrospective On The Sprite Network Operating System*, found at http://www.cs.berkeley.edu/projects/sprite/retrospective.html.visited on Mar. 11, 2005.
Patterson, D., et al., *A Case for Redundant Arrays of Inexpensive Disks (RAID)*, Technical Report, CSD-87-391, Computer Science Divison, Electrical Engineering and Computer Sciences, University of California at Berkeley (1987).
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).
Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia,org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Divison, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

U.S. Appl. No. 60/683,961, entitled System and Method for Remote Execution of a Debugging Using a remote Management Module, Filed by Eric Gumtow et al., on May 23, 2005.

\* cited by examiner

SYSTEM AND METHOD FOR REMOTE EXECUTION OF A DEBUGGING UTILITY USING A REMOTE MANAGEMENT MODULE

CROSS-REFERENCE TO RELATED APPLICATIONS

The present application is a continuation of U.S. application Ser. No. 11/171,558, filed on Jun. 30, 2005, now issued as U.S. Pat. No. 7,634,760, of same title and inventorship, and which claims the benefit of U.S. Provisional Patent Application Ser. No. 60/683,961, which was filed on May 23, 2005, by Eric Gumtow et al. for a SYSTEM AND METHOD FOR REMOTE EXECUTION OF A DEBUGGING UTILITY USING A REMOTE MANAGEMENT MODULE and is hereby incorporated by reference.

This application is related to the following U.S. Patent Application:

U.S. patent application Ser. No. 11/073,342, filed on Mar. 4, 2005 and entitled METHOD AND APPARATUS FOR COMMUNICATING BETWEEN AN AGENT AND A REMOTE MANAGEMENT MODULE IN A PROCESSING SYSTEM, by Thomas Holland, et al., the contents of which are hereby incorporated by reference.

FIELD OF THE INVENTION

The present invention relates to debugging and, more specifically, to remote debugging using a remote management module.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of is a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A common type of file system is a "write in-place" file system, an example of which is the conventional Berkeley fast file system. In a write in-place file system, the locations of the data structures, such as modes and data blocks, on disk are typically fixed. An mode is a data structure used to store information, such as metadata, about a file, whereas the data blocks are structures used to store the actual data for the file. The information contained in an mode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the modes and data blocks are made "in-place" in accordance with the write in-place file system. If an update to a file extends the quantity of data for the file, an additional data block is allocated and the appropriate mode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a storage appliance is the Write Anywhere File Layout (WAFL™) file system available from Network Appliance, Inc. of Sunnyvale, Calif. The WAFL file system is implemented within a microkernel as part of the overall proton col stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that manages data access and may, in case of a filer, implement file system semantics, such as the Data ONTAP™ storage operating system. The storage operating system can also be implemented as an application program operating over a general-purpose operating system, such as UNIX® or Windows NT®, or as a general-purpose operating system with configurable functionality, which is configured for storage applications as described herein.

A storage operating system is typically a complex collection of software, which may include a plurality of modules, processes and programs that execute on a storage system. Programming errors, or bugs, that occur in the storage operating system may cause loss or corruption of the data stored by the storage system. As such, it is desirous to find and remove bugs from ("debug") the storage operating system to ensure data consistency and proper operation of the system. While developers attempt to ensure that a version of the storage operating system is "bug free" before it is released to end users, certain bugs may only manifest error conditions after a version of the system has been released and is utilized in real world conditions. As such, debugging often occurs once the storage system executing the storage operating system has been installed at a client site.

Developers may utilize a variety of tools to aid in debugging. One common tool is the GNU Project Debugger (GDB), which is available from the Free Software Foundation, Inc. of Boston, Mass. GDB comprises two modules, a GDB stub that executes on the computer containing the software to be debugged and a GDB client that executes on a separate computer. The GDB stub typically transmits and receives data over a serial connection to the computer executing the GDB client.

An exemplary storage system environment 100 utilizing GDB is shown in FIG. 1. A storage system 300 is connected to a plurality of clients 125 via a network 105, and to an administration console 130 and a computer executing a GDB client 115 via serial connections 120. Since the administration console 130 and the GDB client 115 utilize serial interfaces, they must be physically close to the storage system 300. However, storage system 300 of such an environment 100 is typically utilized in a remote data center wherein the system is geographically separated (remote) from the location of the developer. Thus, to debug the storage operating system or other software executing on the storage system, the developer must physically travel to the remote data center. This need for developer travel increases the time and difficulty involved with debugging of software, thereby increasing the total cost of ownership of a storage system.

SUMMARY OF THE INVENTION

The disadvantages of the prior art are overcome by providing a system and method for permitting remote execution of a program, such as the GNU Project Debugger (GDB), using a remote management module (RMM). According to the illustrative embodiment, the RMM is integrated with a computer, such as a storage system. The RMM provides an independent network connection between the storage system and a network. A GDB stub executes on the storage system in conjunction with a storage operating system. In addition, a storage operating system packet daemon interfaces with one or more modules of the storage operating system. The GDB stub forwards data to the storage operating system packet daemon, which packetizes (organizes) the data into one or more packets and forwards the packets via a RMM adapter to the RMM. A RMM packet daemon executing on the RMM determines the type(s) of packets received from storage system and forwards any payload data to an appropriate daemon executing on the RMM. For example, GDB packets are forwarded to the GDB daemon. Illustratively, in response to detecting that GDB data has been received, the RMM packet daemon forwards the data to a GDB daemon executing on the RMM.

The GDB daemon, in turn, forwards the data to a network protocol stack on the RMM and onto the GDB client, which may be geographically remote from the storage system. The network protocol stack enables the GDB daemon to transmit the GDB data to a GDB client over the network, such as a local area network (LAN) or wide area network (WAN), thus permitting the developer to be geographically separate from the storage system. By utilizing the RMM and associated software, a GDB client is not required to be located in close physical proximity to the storage system. Accordingly, the present invention permits remote debugging and software analysis of a computer program including a storage operating system.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
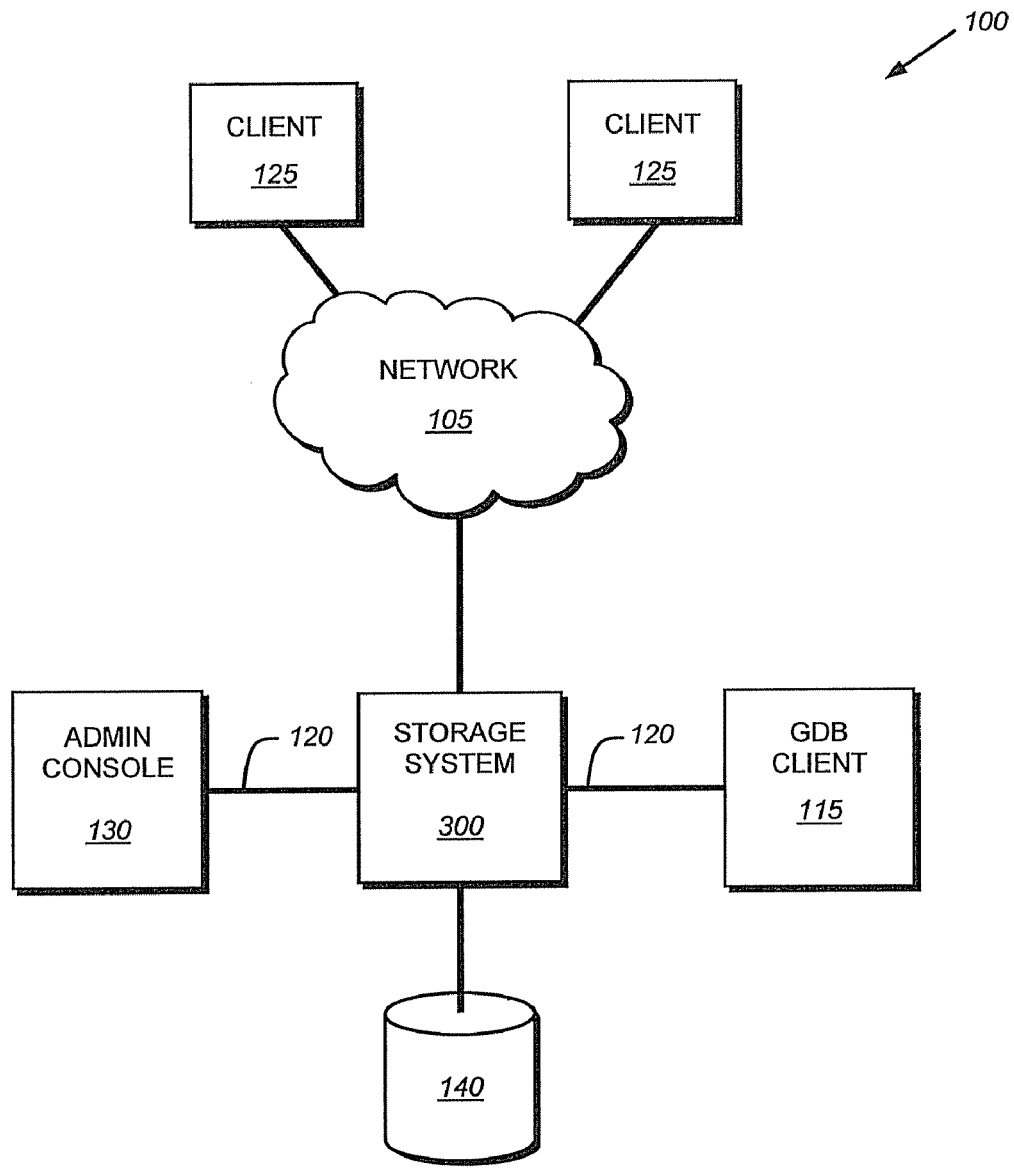
FIG. 1, already described, is a schematic block diagram of an exemplary storage system environment.
Figure 2:
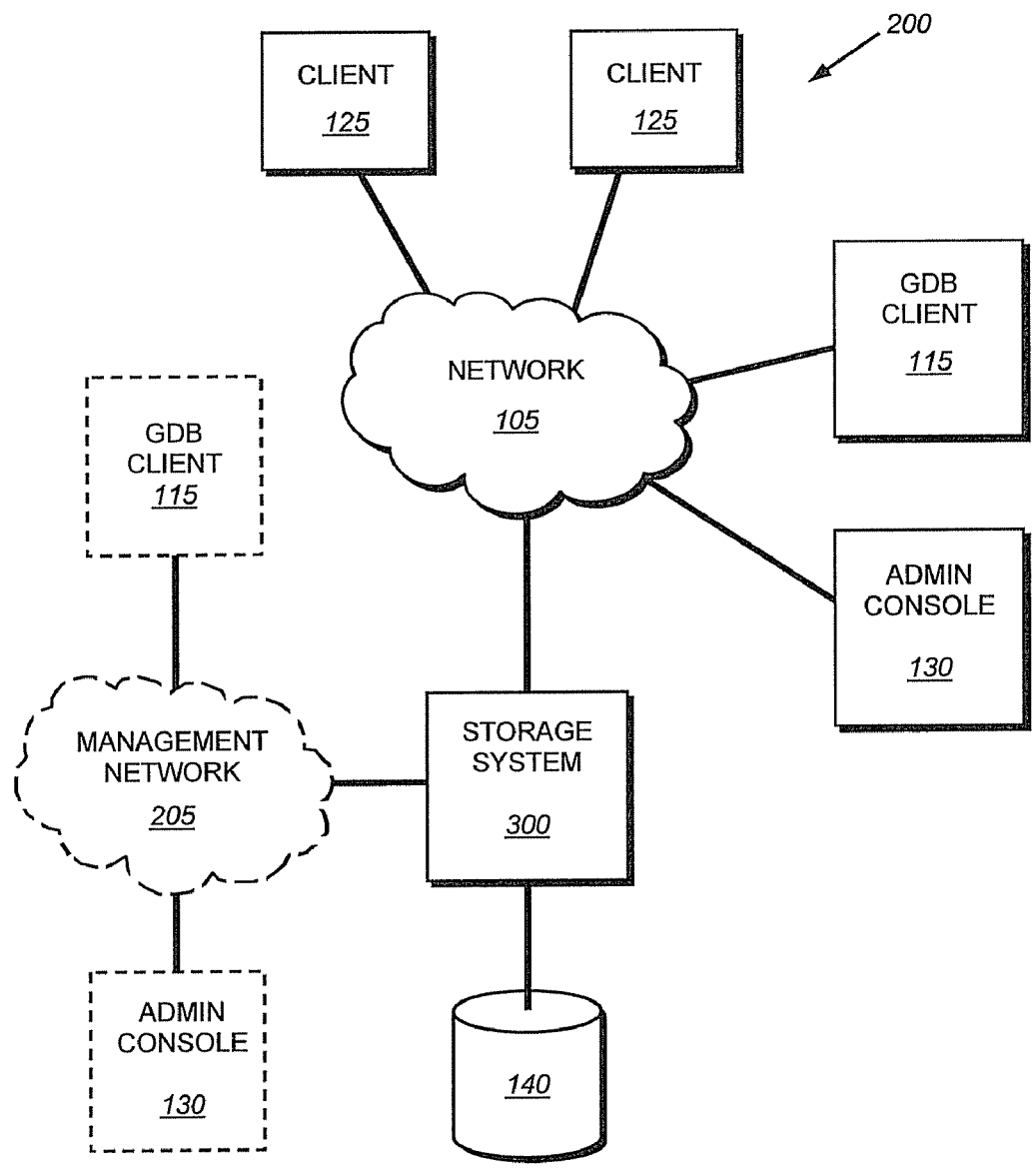
FIG. 2 is a schematic block diagram of an exemplary storage system environment in accordance with an embodiment of the present invention.

FIG. 2 is a schematic block diagram of an exemplary storage system environment 200 in accordance with embodiment of the present invention. The storage system environment 200 comprises a storage system 300 operatively interconnected with one or more storage devices 140, such as disks. A network 105 connects the storage system with a plurality of clients 125. In contrast to the environment 100 shown in FIG. 1, administration console 130 and GDB client 115 are also connected to the network 105, which permits them to be geographically remote from the storage system 300. In accordance with the present invention, a developer may utilize the GDB client 115 and administration console 130 functionality in connection with a storage system 300 that is located in a remote data center without requiring the developer to be physically present at the remote location. To that end, the present invention permits remote execution and debugging of software using a remote management module (RMM), described further below, in conjunction with the storage system.

In an alternate embodiment, the GDB client 115 and administration console 130 may be operatively interconnected with the storage system 300 via a management network 205. In such embodiments, the administration console 130 and GDB client 115 do not utilize the network 105 that is utilized by clients 125.

B. Storage System

Figure 3:
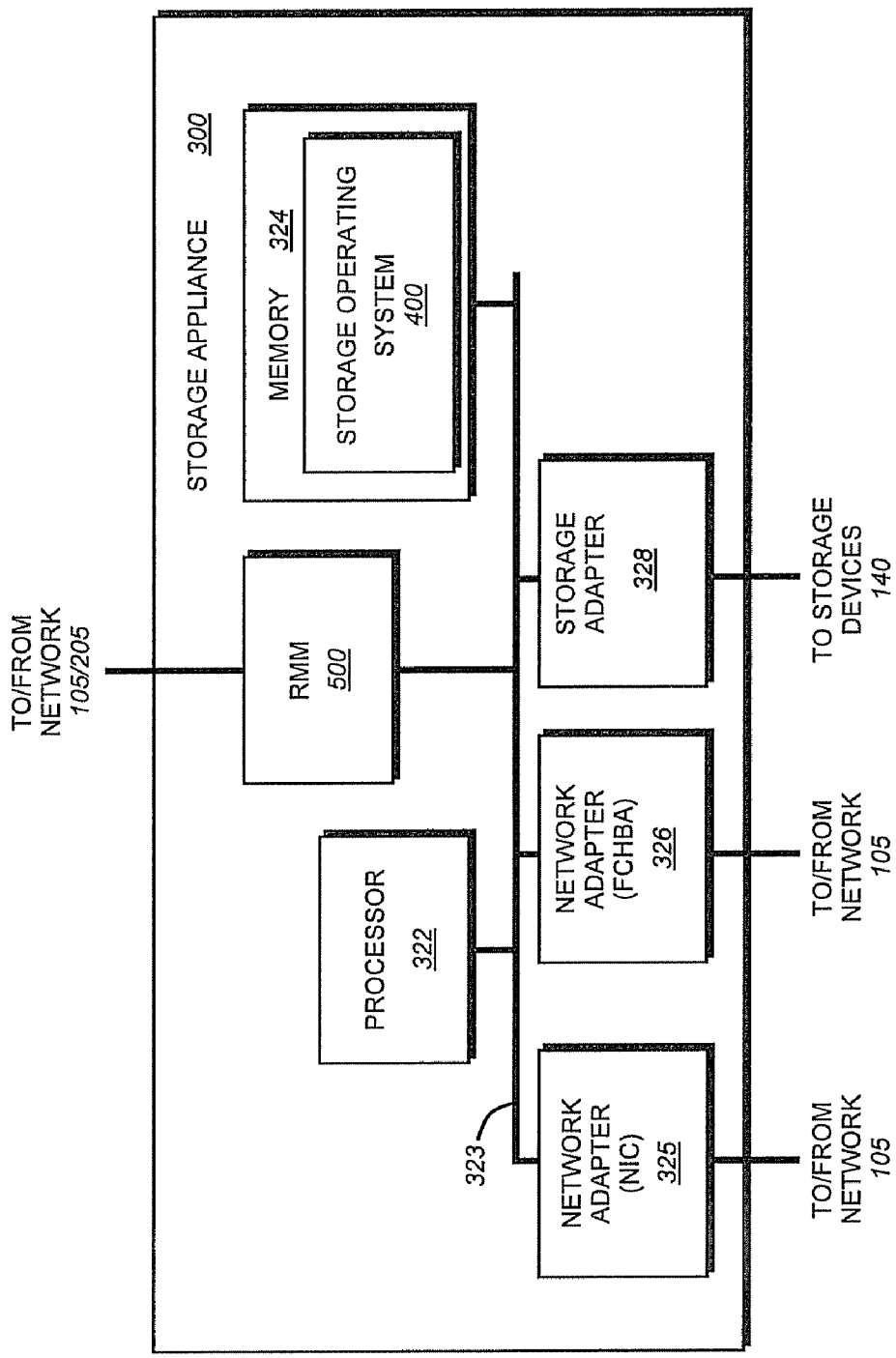
FIG. 3 is a schematic block diagram of an exemplary storage appliance in accordance with an embodiment of the present invention.

FIG. 3 is a schematic block diagram of an illustrative storage system 300 that may be advantageously used with the present invention. The storage system is configured to provide storage service for both file and block protocol access to information stored on storage devices in an integrated manner. In this context, the storage system denotes a computer having features such as simplicity of storage service management and ease of storage reconfiguration, including reusable storage space, for users (system administrators) and clients of network attached storage (NAS) and storage area network (SAN) deployments.

The storage system is illustratively embodied as a storage appliance 300 comprising a processor 322, a memory 324, a plurality of network adapters 325, 326 and a storage adapter 328 interconnected by a system bus 323. The storage appliance 300 also includes a storage operating system 400 that provides a virtualization system (and, in particular, a file system) to logically organize the information as a hierarchical structure of named directory, file and virtual disk (vdisk) storage objects on storage devices, such as disks.

The clients of a SAN-based network environment have a storage viewpoint of blocks or disks. To that end, the storage appliance 300 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 324 comprises storage locations that are addressable by the processor and adapters for storing software program code and data structures associated with the present invention. A portion of memory 324 may be organized as a "buffer cache" for storing data structures for use by the storage operating system during runtime operation. The processor and adapters may, in turn, comprise processing elements and/or logic circuitry configured to execute the software code and manipulate the data structures. The storage operating system 400, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described is herein.

The network adapter 325 may comprise a network interface controller (NIC) that couples the storage appliance to a plurality of clients over point-to-point links, wide area networks, virtual private networks implemented over a public network (Internet) or a shared local area network. The NIC comprises the mechanical, electrical and signaling circuitry needed to connect the appliance to a network.

The storage network "target" adapter 326 also couples the storage appliance 300 to clients that may be further configured to access the stored information as blocks or disks. The network target adapter 326 may comprise a FC host bus adapter (HBA) having the mechanical, electrical and signaling circuitry needed to connect the appliance to a SAN network switch. In addition to providing FC access, the FC HBA may offload fibre channel network processing operations for the storage appliance.

The storage adapter 328 cooperates with the storage operating system 400 executing on the storage appliance to access information requested by the clients. The information may be stored on disks or other similar media adapted to store information. The storage adapter includes I/O interface circuitry that couples to the disks 140 over an I/O interconnect arrangement, such as a conventional high-performance, FC serial link topology. The information is retrieved by the storage adapter and, if necessary, processed by the processor 322 (or the adapter 328 itself) prior to being forwarded over the system bus 323 to the network adapters 325, 326, where the information is formatted into packets or messages and returned to the clients.

Storage of information on the appliance 300 is preferably implemented as one or more storage volumes that comprise a cluster of physical storage disks 140, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The is redundant information enables recovery of data lost when a storage device fails.

One or more virtual disks (vdisks) may be stored within each volume. A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within the file system of the storage system. As used herein, a set of stream inodes denotes one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section. An example of a stream inode object that may be advantageously used with the present invention is described in U.S. Pat. No. 6,643,654 titled SYSTEM AND METHOD FOR REPRESENTING NAMED DATA STREAMS WITHIN AN ON-DISK STRUCTURE OF A FILE SYSTEM, by Kayuri Patel et al., which is hereby incorporated by reference as though fully set forth herein.

Illustratively, a remote management module (RMM) 500 is interconnected with the bus 323. One example of an RMM is described in the above-incorporated patent application entitled METHOD AND APPARATUS FOR COMMUNICATING BETWEEN AN AGENT AND A REMOTE MANAGEMENT MODULE IN A PROCESSING SYSTEM. The RMM provides an additional network interface that enables remote processing systems, such as administration console 130 and/or GDB client 115, to perform various management functions on the storage appliance 300 via the network 105 and/or 205. These management functions may include, for example, monitoring various functions of the storage appliance, modifying the configuration of the storage appliance, performing diagnostics functions on the storage appliance and permitting the utilization of debugging software, such as GDB, via a remote GDB client. The RMM is typically designed to operate independently of the storage appliance 300 and may utilize an independent power supply so that it is accessible even when the storage appliance has been powered off. In an illustrative embodiment of the present invention, the RMM permits a GDB client to remotely debug the storage operating system 400 and/or other software executing on the storage appliance 300.

It should be noted that in the illustrative embodiment, the RMM 500 is shown interconnected with the same network 105 as clients of the storage appliance 300. However, in alternate embodiments, the RMM 500 may be interconnected with a different network than that used to interconnect the clients. For example, the clients 125 may connect with the storage appliance 300 via network 105, while the GDB client 115 and administration console 130 may connect via a management network 205 to the storage appliance 300.

B. Storage Operating System

To facilitate access to the disks, the storage operating system 400 implements a write-anywhere file system that cooperates with virtualization modules to provide a function that "virtualizes" the storage space provided by disks. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "Data ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
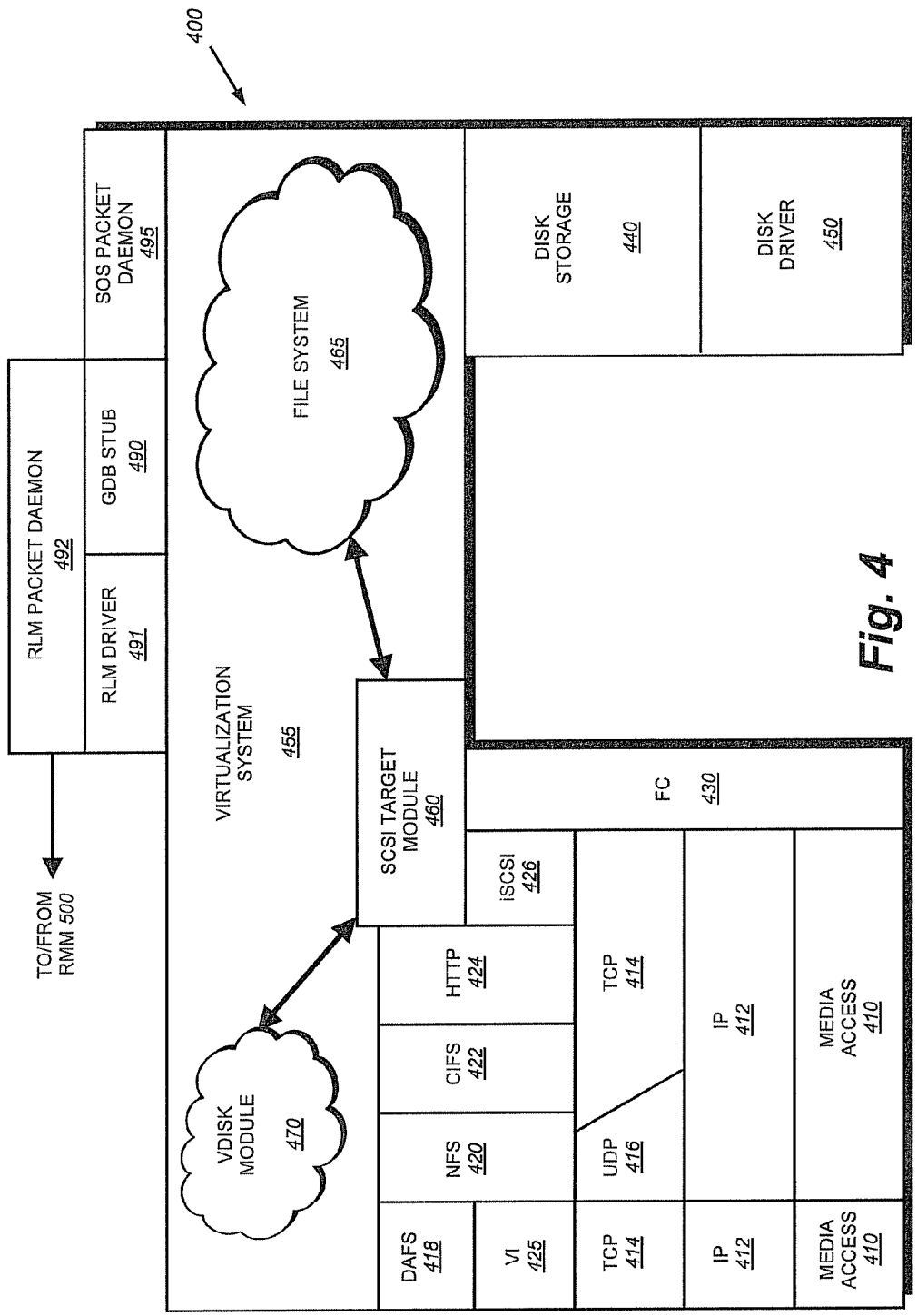
FIG. 4 is a schematic block diagram of an exemplary storage operating system for use on a storage appliance in accordance with an embodiment of the present invention.

FIG. 4 is a schematic block diagram of the storage operating system 400 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access and, to that end, includes support for the DAFS protocol 418, the NFS protocol 420, the CIFS protocol 422 and the Hypertext Transfer Protocol (HTTP) protocol 424. A VI layer 425 implements the VI architecture to provide direct access transport (DAT) capabilities, such as RDMA, as required by the DAFS protocol 418.

An iSCSI driver layer 426 provides block protocol access over the TCP/IP network protocol layers, while a FC driver layer 430 operates with the FC HBA 326 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 440 that implements a disk storage protocol, such as a RAID protocol, and a disk driver layer 450 that implements a disk access protocol such as, e.g., a SCSI protocol.

Bridging the disk software layers with the integrated network protocol stack layers is a virtualization system 455 that is implemented by a file system 465 interacting with virtualization modules illustratively embodied as, e.g., vdisk module 470 and SCSI target module 460. It should be noted that the vdisk module 470, the file system 465 and SCSI target module 460 can be implemented in software, hardware, firmware, or a combination thereof. The vdisk module 470 interacts with the file system 465 to enable access by administrative interfaces in response to a system administrator issuing commands to the multi-protocol storage appliance 300. In essence, the vdisk module 470 manages SAN deployments by, among other things, implementing a comprehensive set of vdisk (lun) commands issued through a user interface by a system administrator. These vdisk commands are converted to primitive file system operations ("primitives") that interact with the file system 465 and the SCSI target module 460 to implement the vdisks.

The SCSI target module 460, in turn, initiates emulation of a disk or lun by providing a mapping procedure that translates luns into the special vdisk file types. The SCSI target module is illustratively disposed between the FC and iSCSI drivers 430, 426 and the file system 465 to thereby provide a translation layer of the virtualization system 455 between the SAN block (lun) space and the file system space, where luns are represented as vdisks. By "disposing" SAN virtualization over the file system 465, the multi-protocol storage appliance reverses the approaches taken by prior systems to thereby provide a single unified storage platform for essentially all storage access protocols.

The file system 465 is illustratively a message-based system; as such, the SCSI target module 460 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 460 passes the message into the file system 465 as, e.g., a function call, where the operation is performed.

The file system 465 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk modes and the inode file, is provided in the above-incorporated U.S. Pat. No. 5,819,292.

SAN clients typically identify and address disks by logical numbers or luns. However, the automated storage virtualization technique allows system administrators to manage vdisks and their addressing by logical names. To that end, the vdisk module 470 of the storage appliance maps logical names to vdisks. For example when creating a vdisk, the system administrator "right size" allocates the vdisk and assigns it a name that is generally meaningful to its intended application (e.g., /vol/vol0/database to hold a database).

Also executing within the storage operating system 400 is a GDB stub 490 and a storage operating system packet daemon 495. The GDB stub 490 is a portion of GDB that is linked into the storage operating system 400 to implement the debugging capabilities of GDB. The GDB stub 490 utilizes a set of debugging hooks integrated into the storage operating system to provide the GDB application program interface (API) to a GDB client. Operation of GDB is well known to those skilled in the art and is described in Debugging with GDB: The GNU Source-Level Debugger, by Richard M. Stallman, et al. The GDB stub 490 interfaces with the storage operating system packet daemon 495 to send/receive GDB data, which is typically transferred one byte at a time, to a GDB client 115 via the RMM 500. The storage operating system packet daemon 495 receives various messages from, for example, the GDB stub 490, and forwards them to the RMM in a packet format. The storage operating system packet daemon 495 also received packets from the RMM and forwards the data contained therein to the appropriate software module, such as the GDB stub 490. In an illustrative embodiment, a remote LAN module (RLM) driver 491 is utilized by the system in conjunction with a RLM packet daemon 492 to transmit/receive packets to/from the RMM 500.

C. Remote Management Module

Figure 5:
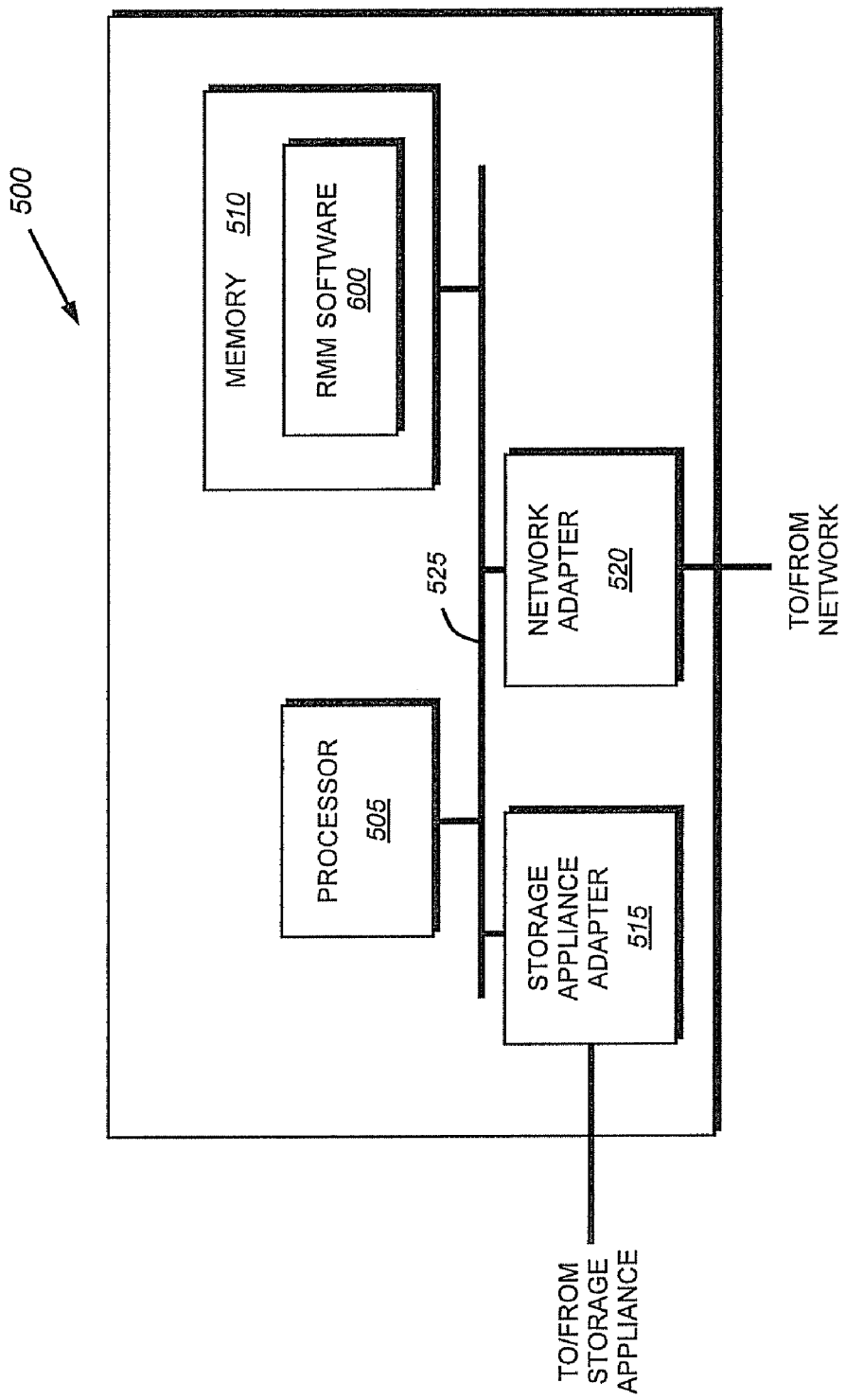
FIG. 5 is a schematic block diagram of an exemplary remote management module in accordance with an embodiment of the present invention.

FIG. 5 is a schematic block diagram of an exemplary RMM 500 in accordance with embodiment of the present invention. The RMM 500 comprises a processor 505, a storage appliance adapter 515, a network adapter 520 and a memory 510 interconnected by a bus 525. The storage appliance adapter 515 provides the physical interface with the hardware and software of the storage appliance. RMM software 600 is stored in memory 510 and executable by the processor 505 to implement the functionality of the RMM. Although described herein as illustratively embodied in software, the functionality of the RMM 500 may be implemented in hardware, software, firmware, or any combination thereof. As such, the description of the RMM 500 executing software 600 to perform functionality should be taken as exemplary only. Additionally, while this description is written in terms of the RMM being a plug-in card that is connected to the storage appliance, the present invention may be utilized with RMMs of varying form factors, including, e.g., a RMM that is incorporated onto a motherboard of the storage appliance.

Figure 6:
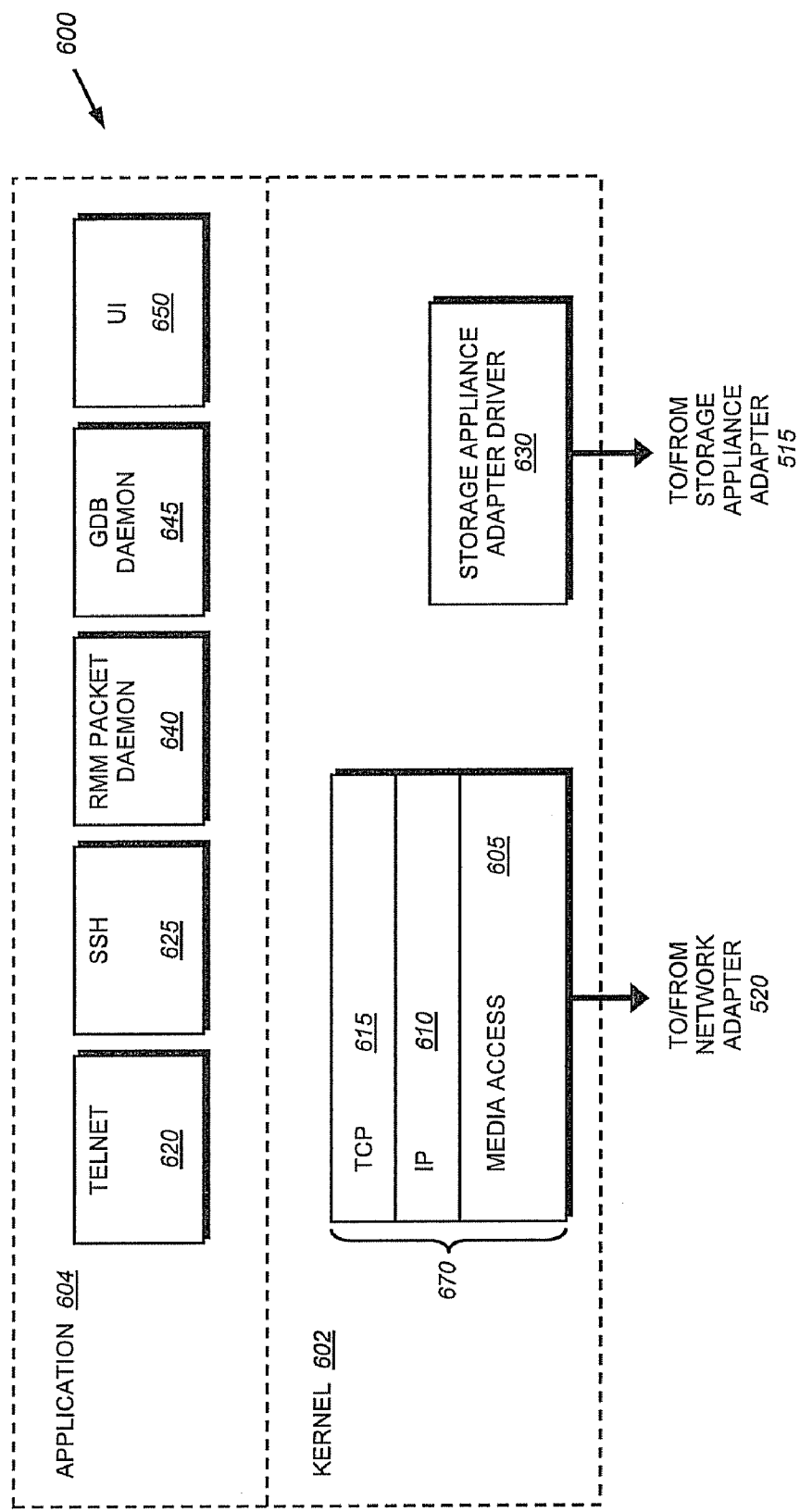
FIG. 6 is a schematic block diagram of software modules executing on a remote management module in accordance with an embodiment of the present invention.

FIG. 6 is a schematic block diagram of the RMM software 600 executing on the RMM 500 in accordance with an embodiment of the present invention. The software 600 comprises a kernel layer 602 and an application layer 604. The kernel layer 602 comprises a network protocol stack 670 that illustratively includes a media access layer 605, an Internet Protocol (IP) layer 610 and its associated Transport Control Protocol (TCP) layer 615. The network protocol stack 670 is utilized by various other modules for communicating via the network adapter 520 of RMM 500 to the GDB client and/or the administration console over the network. Within the application layer 604 may be one or more higher level protocol modules, such as a telnet module 620 and/or an SSH module 625.

A storage appliance adapter driver module 630 of the kernel layer 602 interfaces with the storage appliance adapter 515 of the RMM to pass messages embodied as packets between the RMM 500 and the storage appliance 300. A RMM packet daemon 640, executing within the application layer 602, interfaces with the storage appliance adapter driver 630 to receive incoming packets from the storage appliance and interpret the received packets to determine to which application level 604 module they are to be forwarded. For example, GDB packets are forwarded to a GDB daemon 645. Other packet types may be forwarded to other demons (not shown) within the application layer 604. Also included within the RMM software 600 is a user interface (UI) 650 that is utilized by an administrator or developer to issue commands to the RMM 500. For example, the UI 650 may include a command to initialize the GDB daemon 645 to enable the RMM 500 to process GDB packets in accordance with the teachings of the present invention.

D. RMM Packet Format

Figure 7:
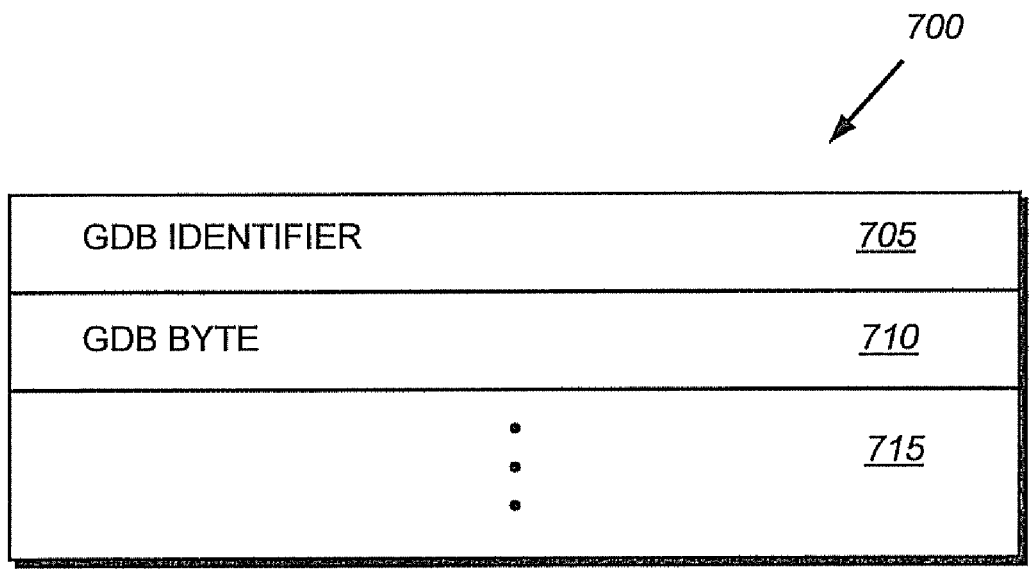
FIG. 7 it is a schematic block diagram of an exemplary remote management module packet in accordance with embodiment of the present invention.

FIG. 7 is a schematic block diagram of an exemplary remote management module packet 700 for use in transporting GDB data in accordance with an illustrative embodiment of the present invention. In the illustrative embodiment, GDB data is sent in single is byte packets, i.e., each packet only contains a single byte of GDB data. The RMM packet 700A illustratively comprises a GDB identifier field 705, a GDB byte field 710 and, in alternate embodiments additional fields 715. The GDB identifier field 705 holds a magic value, i.e., a predefined value, that identifies a type of packet, such as a GDB packet. The GDB byte field 710 contains a single byte of GDB data.

E. Remote Execution of Software Using a RMM

The present invention provides a system and method for permitting the remote execution of a program, such as the GNU Project Debugger (GDB), using a remote management module (RMM). According to the illustrative embodiment, the RMM is integrated with a computer, such as a storage system. The RMM provides an independent network connection between the storage system and a network. Executing on the storage system in conjunction with the storage operating system is a GDB stub. Also executing on the storage system is a storage operating system packet daemon that interfaces with one or more modules of the storage operating system. The GDB stub forwards data to the packet daemon, which packetizes the data and forwards the packets via a RMM adapter to the RMM. Executing on the RMM is a RMM packet daemon that determines the type of received packet and forwards the payload data to an appropriate daemon executing on the RMM. Illustratively, when the RMM packet daemon detects that GDB data has been received, it forwards the data to a GDB daemon executing on the RMM.

The GDB daemon then forwards the received data via a network protocol stack on the RMM to the GDB client, which may be geographically remote from the storage appliance. The network protocol stack enables the GDB daemon to transmit the GDB data to a GDB client that is connected via a network, such as a local area network (LAN) or wide area network (WAN), which permits the developer to be geographically separate from the storage system. By utilizing the RMM and associated software, a GDB client is not required to be physically located in close physical proximity to the storage appliance. This permits the remote debugging and software analysis of a computer program including a storage operating system.

Figure 8:
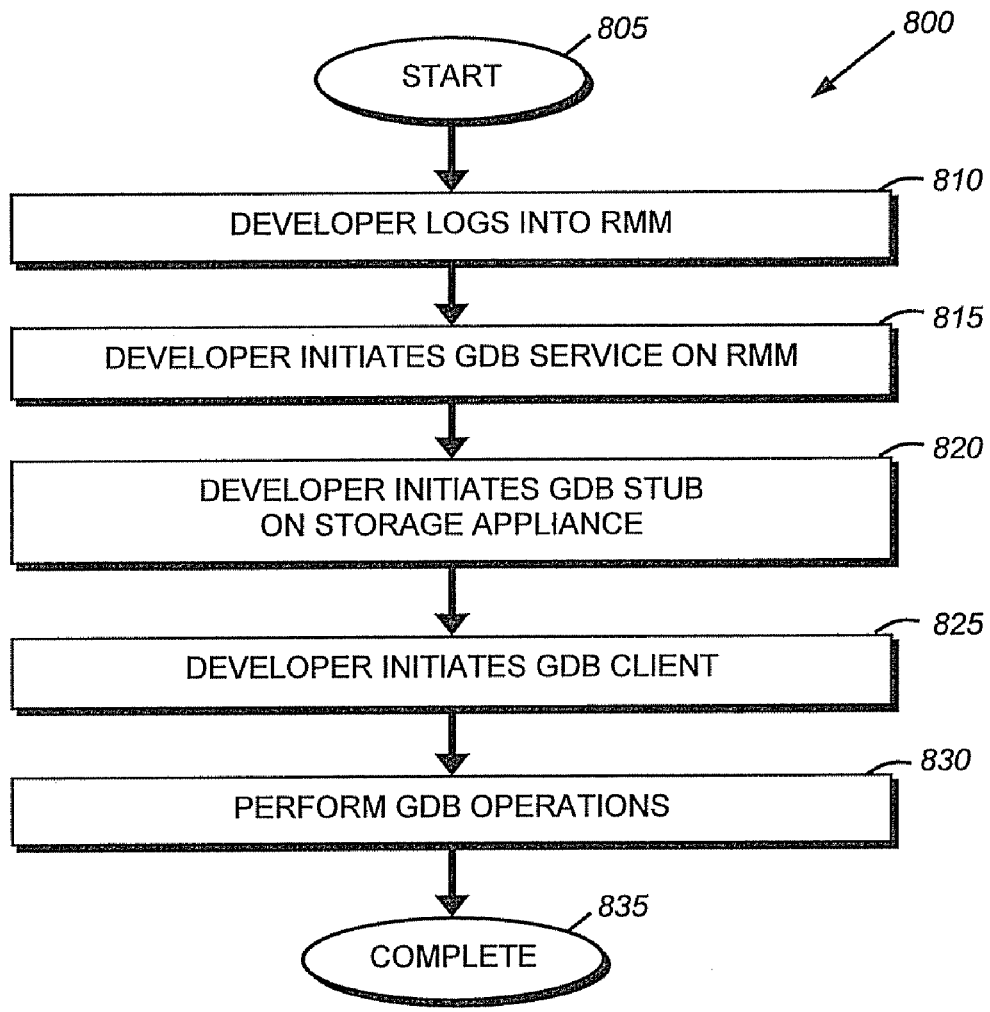
FIG. 8 is a flowchart detailing the steps of a procedure for initiating a remote debugging session in accordance with an embodiment of the present invention.

FIG. 8 is a flowchart detailing the steps of a procedure 800 for initiating a GDB debugging session in accordance with an illustrative embodiment of the present invention. The procedure begins in step 805 and continues to step 810 where the developer first logs into the RMM using, e.g., the conventional telnet or SSH protocol. Once logged into the RMM, the developer may then initiate the GDB service on the RMM in step 815 by, for example executing a GDB command via the user interface (UI) 650. The GDB command initiates the GDB packet daemon and permits the RMM to begin servicing and forwarding GDB packets between the GDB stub executing on the storage appliance and the GDB client. The developer then initiates the GDB stub on the storage appliance in step 820 by, for example, entering a user interface command to the storage appliance via the administrative console to initiate the GDB stub. In step 825, the developer may then initiate the GDB client by, e.g., initiating the GDB program on a computer serving as the client. The developer may then perform appropriate GDB operations in step 830 before completing in step 835.

Figure 9:
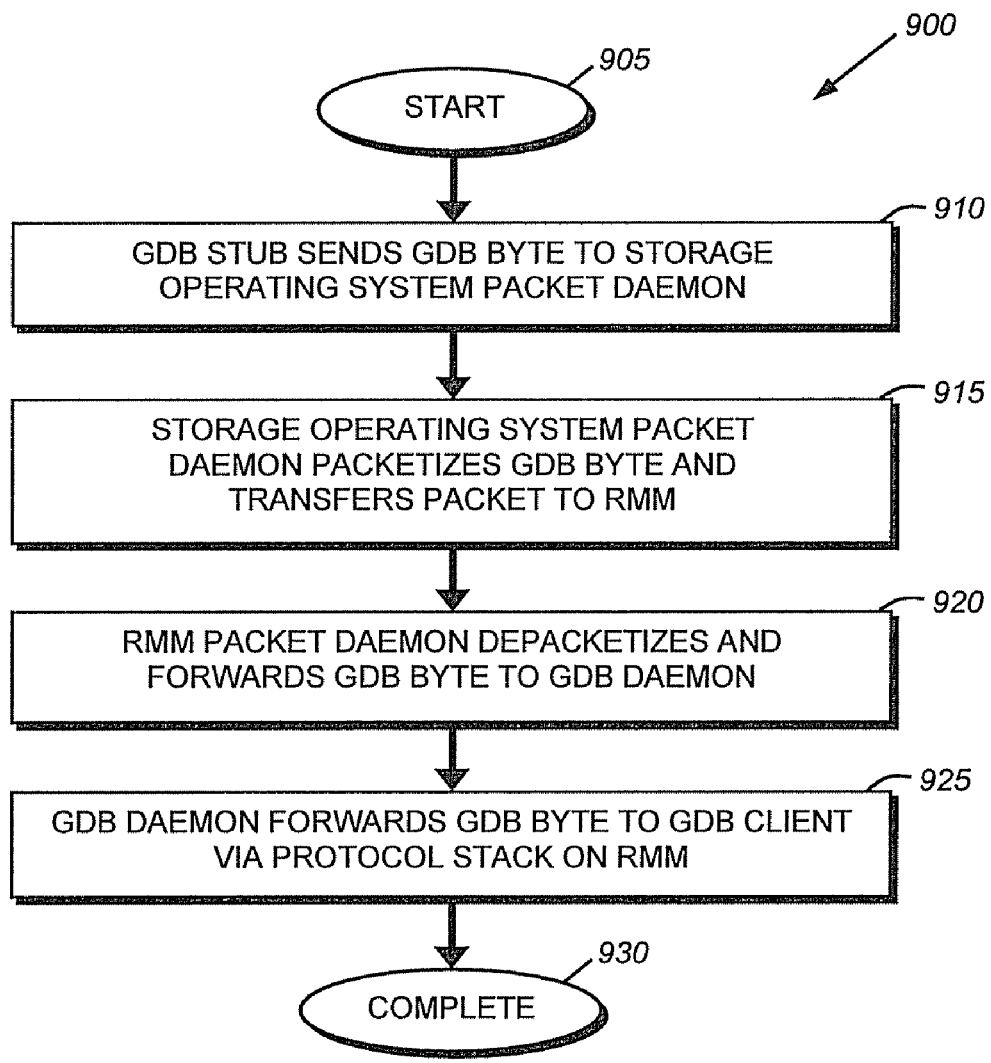
FIG. 9 is a flowchart detailing the steps of a procedure for transmitting data from a GDB stub executing on a storage appliance to a GDB client in accordance with an embodiment of the present invention.

FIG. 9 is a flowchart detailing the steps of an illustrative procedure 900 for passing GDB data from the GDB stub to a remote GDB client in accordance with an embodiment of the present invention. The procedure 900 begins in step 905 and continues to step 910 where the GDB stub sends a GDB byte to the storage operating system packet daemon. This may be accomplished via a conventional remote procedure call (RPC) or any other form of interprocess communication (IPC) within the storage operating system executing on the storage appliance. In response, the storage operating system packet daemon packetizes the GDB byte and transfers the packet to the RMM in step 915. Specifically, the GDB data byte is prepended with the GDB identifier field 705 to form packet 700A in accordance with an embodiment of the present invention. In alternate embodiments, a plurality of GDB bytes may be temporarily buffered before being used to generate a multi-byte packet 700B. The packet is then transferred to the RMM via the storage appliance adapter within the RMM. The RMM packet daemon executing on the RMM removes the GDB byte contained within the packet (i.e., depacketizes) and forwards the GDB byte to the GDB daemon executing on the RMM (step 920). The GDB daemon receives the GDB byte and forwards it to the GDB client utilizing the protocol stack executing on the RMM in step 925. The procedure then completes in step 930.

In an alternate embodiment, the RMM packet daemon analyzes the packets in its in queue to determine if there are a plurality of packets having an identical type (e.g., GDB packets) that are adjacent. If there are a plurality of adjacent packets of the same type, the RMM packet daemon merges the payload data into a single message that is forwarded to the GDB daemon. This reduces the amount of processing needed to be performed by the processor 505 of the RMM 500. In such an alternate embodiment, the GDB daemon receives the multi-byte message and forwards it to the GDB client using the protocol stack as described above in step 925 before the procedure completes 930.

Figure 10:
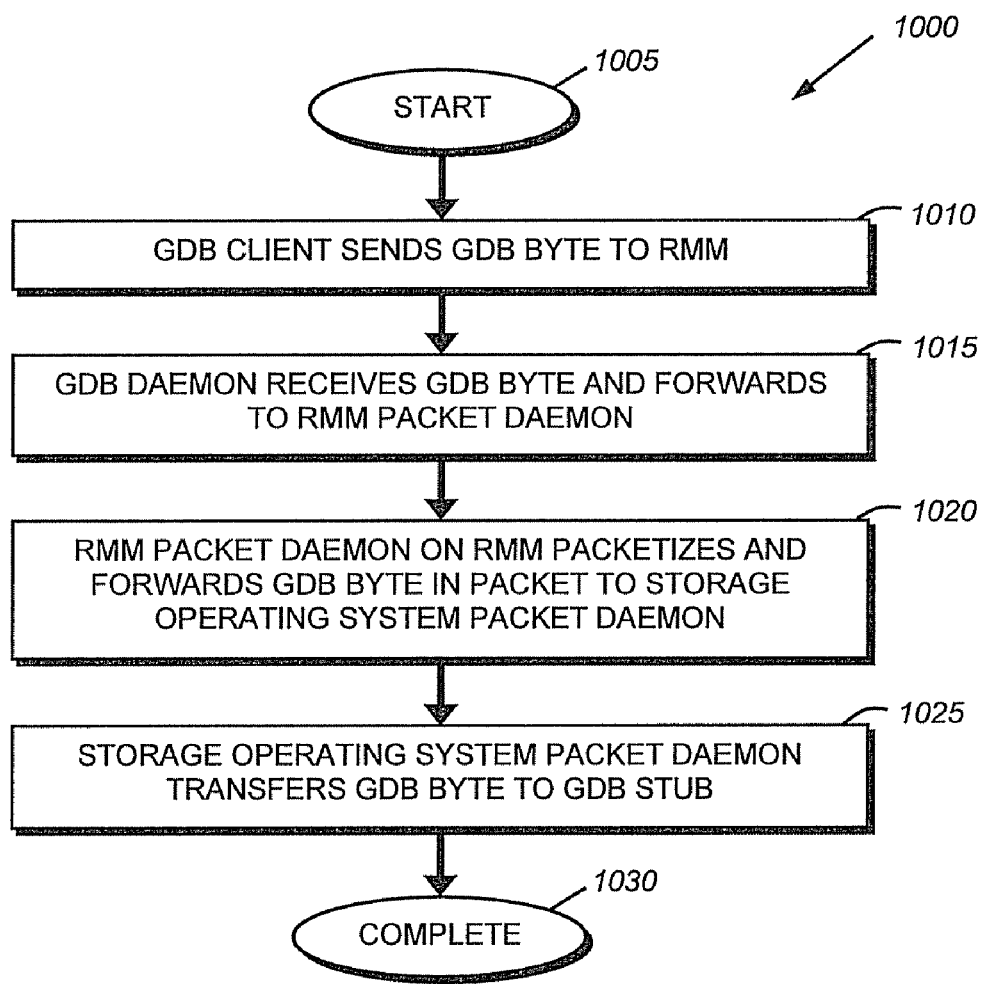
FIG. 10 is a flowchart detailing the steps of a procedure for transmitting data from a GDB client to a GDB stub executing on a storage appliance in accordance with an embodiment of the present invention.

FIG. 10 is a flowchart of a procedure 1000 for transmitting a GDB byte from a GDB client to a GDB stub in accordance with an embodiment of the present invention. The procedure 1000 begins in step 1005 and continues to step 1010 where the GDB client sends a GDB byte to the RMM using, e.g., an appropriate protocol (e.g., telnet/SSH) over the network. The GDB daemon in the RMM receives the GDB byte and forwards it to the RMM packet daemon in step 1015. The RMM packet daemon receives the GDB byte, generates an appropriate packet and forwards the generated packet to the storage operating system packet daemon via the storage appliance adapter in step 1020. As noted in the illustrative embodiment, a packet is generated for every GDB byte to be transmitted. The storage operating system packet daemon receives the packet and forwards the GDB byte to the GDB stub for processing in step 1025 before the procedure 1000 completes in step 1030.

Figure 11:
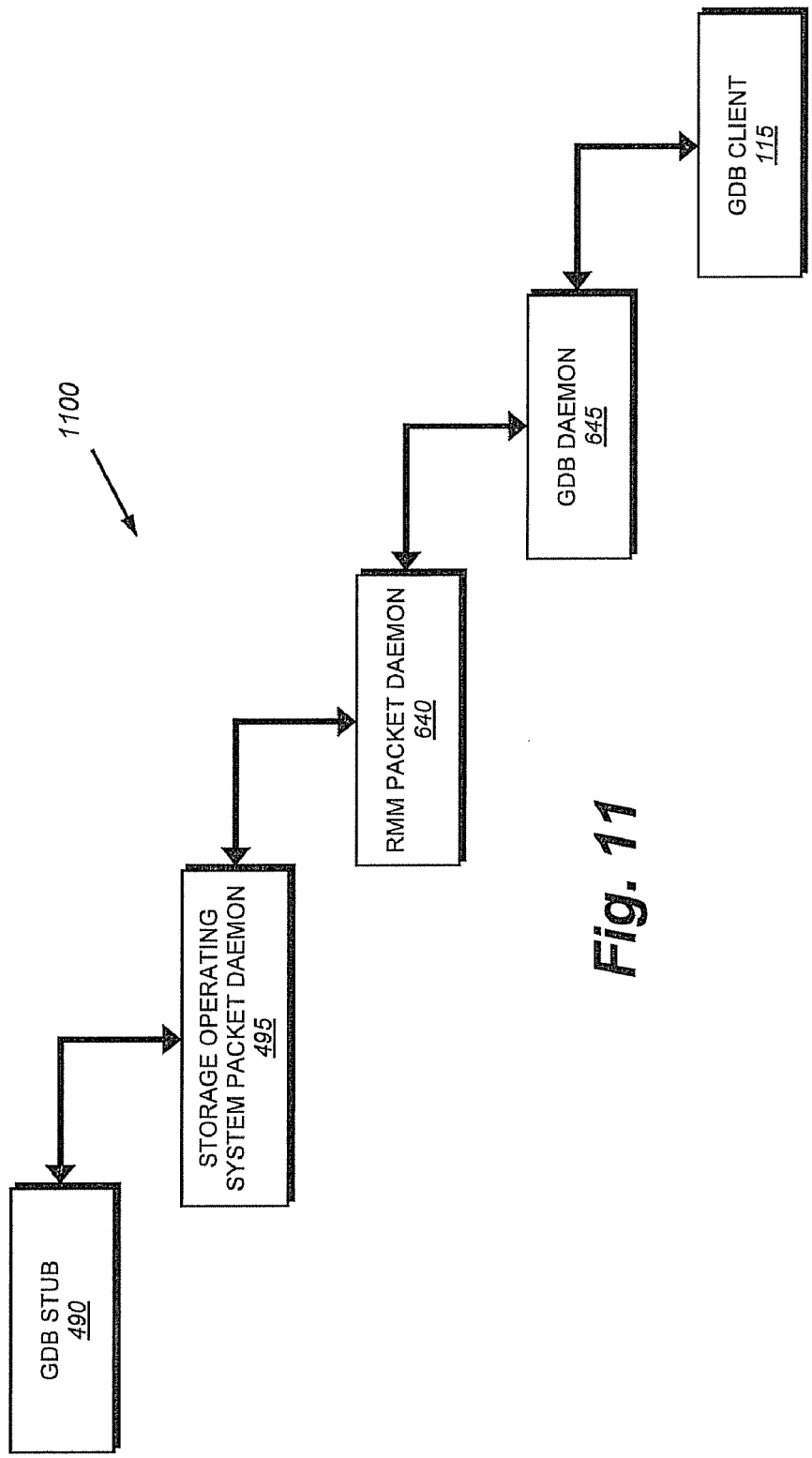
FIG. 11 is a schematic block diagram showing the flow of data in a storage system environment using a remote management module in accordance with an embodiment of the present invention.

FIG. 11 is a schematic flow diagram 1100 showing the various software modules used to implement an illustrative embodiment of the present invention. A GDB stub 490 communicates via RPCs or another IPC mechanism with the storage operating system packet daemon 495. Communication over the IPC mechanism comprises transmission of GDB bytes to/from the GDB stub 490. The storage operating system packet daemon 495 communicates with the RMM packet daemon 640 using packets 700. The packet daemons 495, 640 generate appropriate packets 700 for use in communicating between the storage appliance and the RMM. The RMM packet daemon 640 detects the type of packet 700 received from the storage operating system packet daemon 495 and forwards GDB bytes to the GDB daemon 645 on the RMM. The GDB daemon 645 communicates with the GDB client 115 via the network protocol stack 670 and associated network 105. The GDB client 115 is utilized by a developer for performing appropriate software analysis of the storage operating system and/or other software that is associated with the GDB stub 490.

To again summarize, the present invention enables the remote debugging of a computer using a RMM. A conventional GDB stub executes on the computer and interfaces with a storage operating system packet daemon executing on the computer. Data is passed from the GDB stub to the storage operating system packet daemon which, in turn, packetizes the data and forwards it to a RMM packet daemon executing on the RMM. The RMM packet daemon decodes the packet and forwards the data to a GDB daemon executing on the RMM. The GDB daemon then forwards the received data to a GDB client that is remotely connected via a network using a network protocol stack within the RMM. The use of the present invention enables a developer to execute a debugger, such as GDB, over a network and obviates the need for a direct serial port connection between a debugging client and the computer.

It should be noted that while the present invention has been described in terms of GDB executing on a storage appliance, the principles of the present invention may be utilized using any program or debugger executing on any form of computer that is compatible with the teachings of the present invention. Similarly, the RMM has been described as a card that is inserted via, for example, a plug-in connector, into the storage appliance. However, in alternate embodiments, the RMM may be integrated into a computer or may comprise a stand-alone box that interfaces via alternate techniques with a computer. Additionally, data has been described in terms of a GDB byte being transmitted from a GDB stub to a GDB client (and vice versa). While a singular tense has been utilized to describe the data, the term GDB byte should be taken to include a plurality of bytes of data, which may be utilized in accordance with alternate embodiments of the present invention. Additionally, the functionality of the various software modules may be combined so that the modules perform varying and/or differing functions. For example, the functionality of the RMM packet daemon and the GDB daemon may be combined into a single module on the RMM. Furthermore, various modules may reside in an application and/or kernel layer that differs from the illustrative embodiment without departing from the scope of the present invention. As such, the description above the present invention should be taken as illustrative only.

The foregoing has been a detailed description of the illustrative embodiment of the present invention. Various modifications and additions can be made without departing from the spirit and scope of the invention. Additionally, while this description has been written with reference to storage appliances and file servers, the principles are equally pertinent to all types of computers. Furthermore, it is expressly contemplated that the teachings of this invention can be implemented as software, including a computer-readable media having program instructions executing on a computer, hardware, firmware, or a combination thereof. Accordingly this description is to be taken only by way of example and not to otherwise limit the scope of the invention.

What is claimed is:

1. A method for operating a storage system, comprising:
    forwarding data from a debugger stub program executing on a processor of the storage system to a first packet daemon;
    forwarding, by the first packet daemon, the data to a remote management module;
    forwarding, by the remote management module, the data to a second packet daemon executing on the remote management module;
    forwarding, by the second packet daemon, the data to a protocol stack of the storage system; and
    transmitting the data over a computer network to a remote computer operating a debugger client.

2. The method of claim 1 further comprising packetizing the data.

3. The method of claim 2 wherein the packetized data comprises an identifier file and a data field.

4. The method of claim 2 further comprising buffering the data before being packetized.

5. The method of claim 1 further comprising providing, by the remote management module, an independent network connection between the storage system and the computer network.

6. The method of claim 1 wherein the protocol stack implements Transport Control Protocol/Internet Protocol.

7. The method of claim 1 further comprising:
    determining that a plurality of packets that have an identical type are adjacent; and
    merging the plurality of adjacent packets into a single message.

8. The method of claim 1 wherein the debugger stub is operatively connected to the remote management module.

9. The method of claim 1 wherein the debugger client comprises a GNU Project Debugger (GDB) client.

10. An apparatus, comprising:
    a packet daemon configured to communicate with a computer, the packet daemon further configured to packetize data to be sent to the computer and further configured to forward received data from the computer to a program daemon; and
    wherein the program daemon is configured to forward the received data to a debugger program client using a protocol stack of a remote management module and is further configured to transmit the received data from the debugger program client to the packet daemon via a computer network.

11. The apparatus of claim 10 wherein the computer comprises a storage system.

12. The apparatus of claim 10 wherein the debugger stub is operatively connected to the remote management module.

13. The apparatus of claim 10 wherein the program daemon is a GNU Project Debugger (GDB) daemon.

14. The apparatus of claim 10 wherein the packet daemon is a storage operating system packet daemon.

15. The apparatus of claim 10 further comprising a remote management module packet daemon executing on the remote management module.

16. The apparatus of claim 10 wherein the network is a management network.

17. The apparatus of claim 10 wherein the network is remotely connected to the debugging program client.

18. The apparatus of claim 10 further comprising an administrative console, wherein the administrative console is configured to execute debugging software associated with the debugging program client via the network.

19. A computer readable medium containing executable program instructions executed by a processor, comprising:
    program instructions that forward data from a debugger stub program executing on a processor of the storage system to a first packet daemon;

program instructions that forward, by the first packet daemon, the data to a remote management module;

program instructions that forward, by the remote management module, the data to a second packet daemon executing on the remote management module;

program instructions that forward, by the second packet daemon, the data to a protocol stack of the storage system; and program instructions that transmit the data over a computer network to a remote computer operating a debugger client.

20. A method for operating a storage system, comprising:

transmitting data from a remote computer operating a debugger client over a computer network to a remote management module; forwarding, by a first packet daemon executing on the remote management module, the data to a second packet daemon executing on the storage system; and forwarding the data from the second packet daemon to a debugger stub program executing on a processor of the storage system.

* * * * *

UNITED STATES PATENT AND TRADEMARK OFFICE
CERTIFICATE OF CORRECTION

PATENT NO. : 8,201,149 B1
APPLICATION NO. : 12/554171
DATED : June 12, 2012
INVENTOR(S) : Eric Gumtow et al.

It is certified that error appears in the above-identified patent and that said Letters Patent is hereby corrected as shown below:

In the Specifications:

In col. 1, line 53 should read:
Files is a hallmark of ~~is~~ a NAS system, which is enabled In col. 2, line 25 should read:
Data structures, such as ~~modes~~ inodes and data blocks, on disk are In col. 2, line 26 should read:
Typically fixed. An ~~mode~~ inode is a data structure used to store In col. 2, line 29 should read:
The information contained in an ~~mode~~ inode may include, e.g., In col. 2, line 36 should read:
~~Modes~~ inodes and data blocks are made "in-place" in accordance In col. 2, line 39 should read:
Block is allocated and the appropriate ~~mode~~ inode is updated to In col. 2, line 55 should read:
Part of the overall ~~proton~~ protocol stack of the filer and associated In col. 6, line 4 should read:
Instructions pertaining to the invention described ~~is~~ herein.

In col. 6, line 45 should read:
Data. The ~~is~~ redundant information enables recovery of data Signed and Sealed this
Twenty-fifth Day of June, 2013

Teresa Stanek Rea
*Acting Director of the United States Patent and Trademark Office*

CERTIFICATE OF CORRECTION (continued)
U.S. Pat. No. 8,201,149 B1

In col. 9, line 37 should read:
Structure of the file system, including on-disk ~~modes~~ <u>inodes</u> and the In col. 10, line 67 should read:
Data is sent in single ~~is~~ byte packets, i.e., each packet only